R. H. COWLES.
ROTARY ENGINE.
APPLICATION FILED JUNE 25, 1917.

1,280,169.

Patented Oct. 1, 1918.
5 SHEETS—SHEET 1.

WITNESSES:

INVENTOR
Ray H Cowles
by Strong & Townsend
ATTORNEYS

R. H. COWLES.
ROTARY ENGINE.
APPLICATION FILED JUNE 25, 1917.

1,280,169.

Patented Oct. 1, 1918.
5 SHEETS—SHEET 2.

R. H. COWLES.
ROTARY ENGINE.
APPLICATION FILED JUNE 25, 1917.

1,280,169.

Patented Oct. 1, 1918.
5 SHEETS—SHEET 4.

WITNESSES:
Charles Pehles
J. H. Herring

INVENTOR
Ray H. Cowles
BY Strong & Townsend
ATTORNEYS

UNITED STATES PATENT OFFICE.

RAY H. COWLES, OF SAN FRANCISCO, CALIFORNIA.

ROTARY ENGINE.

1,280,169.  Specification of Letters Patent.  Patented Oct. 1, 1918.

Application filed June 25, 1917. Serial No. 176,749.

*To all whom it may concern:*

Be it known that I, RAY H. COWLES, a citizen of the United States, residing at the city and county of San Francisco and State of California, have invented new and useful Improvements in Rotary Engines, of which the following is a specification.

This invention relates to a rotary, multi-cylinder, four-cycle gas engine.

One of the objects of the present invention is to construct a four-cycle internal combustion engine of the rotary cylinder type, which is so designed that vibration is reduced to a minimum, the volumetric efficiency is considerably increased, and the cooling of the cylinders rendered more effective and uniform. Another object of the invention is to provide an engine of the character described which embodies a novel cylinder mounting, a valve mechanism, a cam shaft drive and mounting, a piston and fly-wheel connection, an ignition mechanism, and other details of construction which permit ready dismantling, fuel economy, reduced weight, better lubrication, and other features which will hereinafter be more fully described, having reference to the accompanying drawings, in which—

Referring to the drawings in detail, A indicates a stationary crank-shaft, 2 the webs of the shaft, and 3 the crank pin. Mounted to rotate about the crank pin is a hub member 4, which in this instance serves as a multi-cylinder head, a valve casing, a bearing for the cylinders in general indicated at 5, 6 and 7, respectively, a mixing chamber for the incoming gas and a housing for the cam shaft, together with the gear mechanism whereby it is operated.

Interiorly of the hub member is an internal gear 8 and secured on the stationary crank pin 3 is a spur gear 9. Turnably mounted in ball bearings 10, supported within the hub, is a sleeve 11, and journaled on projecting arms 12 carried by said sleeves is a pair of intermediate gears 13 which intermesh both with the internal gear 8 and the spur gear 9. The hub member proper is also mounted upon ball bearings, as shown at 14, and this, together with the cylinders, is adapted to revolve about the stationary crank pin 3 when the engine is operating. The internal gear will turn in unison with the hub and cylinders and will thereby impart a revolving movement to the intermediate gears 13, causing the same to turn one revolution about their axes, when making a complete revolution around the stationary gear 9. The gear ratio is one to three, that is, the internal gear is provided with thirty-six teeth and the spur gear 9, together with the intermediate gears 13, are each provided with twelve teeth. The internal gear, together with the hub and cylinders carried thereby, will, therefore, make one and one-third revolutions while the intermediate gears travel once about the stationary gear. The sleeve 11, carrying the intermediate gears, will also make one revolution, and as a pair of cam members 15 and 15ª are secured upon the sleeve it becomes possible to open and close the inlet and exhaust valves, indicated at 16 and 17, respectively, on each cylinder once during each two revolutions of the hub member and the cylinders.

The inlet valves as here shown are positioned centrally and directly at the inner end of each cylinder. They are, furthermore, guided at their upper ends in a bearing formed in the valve seat 18 and at their inner ends in bearings 19 formed in a guide ring 20. A spring 21, interposed between the valve seat and a collar on the inner end of the rod, normally holds each inlet valve on its seat, and a roller secured on the inner end of each rod, when engaged by one of the cams 15, serves to lift the valve from its seat when a coöperating piston assumes the proper position.

The exhaust valves are arranged on the forward side of each cylinder as close to the inner end as possible. They are also carried by a valve seat 21' and the stems are guided in a bearing formed centrally thereof. Each valve is similarly held in its seat by a spring 22 and is lifted away from its seat by a rocker-arm 23 which is operated by a push-rod 24 guided in a bearing 25 formed in the hub member. Each push-rod is provided with a roller at its inner end which is engaged at the proper time by one of the cams 15, thereby forcing each rod in an outward direction to operate the rocker-arms and lift the connected exhaust valves from their seats.

Mounted in each cylinder is a piston 26 which is provided with a cross-head pin 27, and turnably mounted on each cross-head pin is a connecting rod 28, the outer end of which is pivotally connected to a pin 29 secured in a fly-wheel consisting of two rim sections 30 and 31. Each rim section of the fly-wheel is supported by spokes 32 and these are in turn secured to hub members 33 journaled on ball bearings 34 carried by the main crank shaft A. The fly-wheel proper is concentrically positioned with relation to the crank shaft A while the cylinders and connected hub 4 are eccentrically positioned. This construction permits each individual piston member to be connected with the rim of the fly-wheel, as indicated at 35, and, furthermore, permits each individual cylinder to be connected with the fly-wheel rim by means of an extension 36 and a crank arm 37. Each extension 36 and crank arm 37 serves the function of a master connecting rod; that is, it permits freedom of movement between the cylinders and fly-wheel but will at the same time maintain a fixed relation between the same during each revolution.

Figures 1, 2, 3:
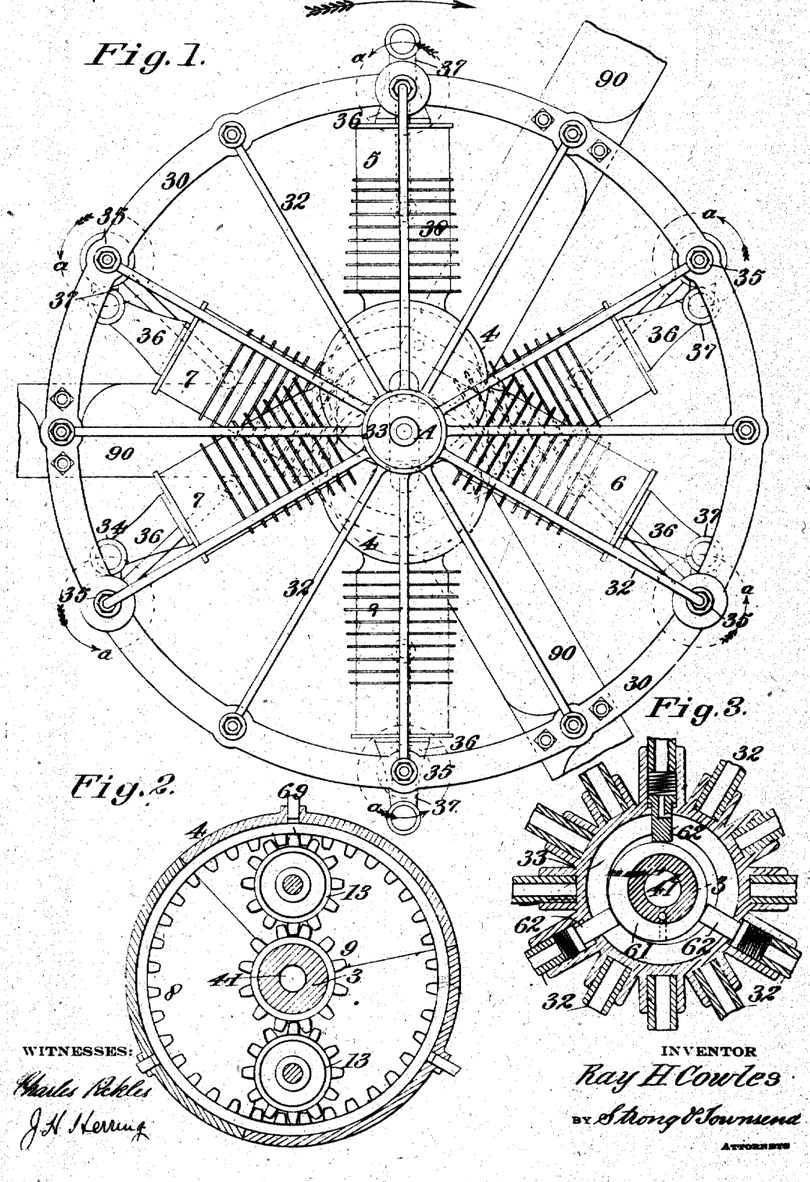
Figure 1 is a side elevation of the engine.
Fig. 2 is a detail view of the cam gears.
Fig. 3 is an enlarged cross section on line 3—3 of Fig. 6.

The eccentric position of the cylinders with relation to the fly-wheel is such that the pistons will assume their outermost position when reaching the point indicated at 38 (see Fig. 1) and their innermost position at the point opposite. This movement of the pistons relative to the cylinders and fly-wheel causes each crank connection 37 to make one complete revolution, as indicated by arrows a, each time the cylinders and fly-wheel complete a revolution, thereby transmitting one complete reciprocation to each piston with relation to its cylinder.

The present illustration of the engine shows a puppet valve movement which permits a four-cycle principle of operation. This can be understood when it is taken into consideration that the sleeve carrying the cams 15 only revolves one revolution while each cylinder revolves 1⅓ revolutions. Each cam will, therefore, open and close each exhaust and inlet valve once during each two revolutions of each cylinder, thereby permitting a four-cycle function to take place with relation to each cylinder.

Figures 4, 5:
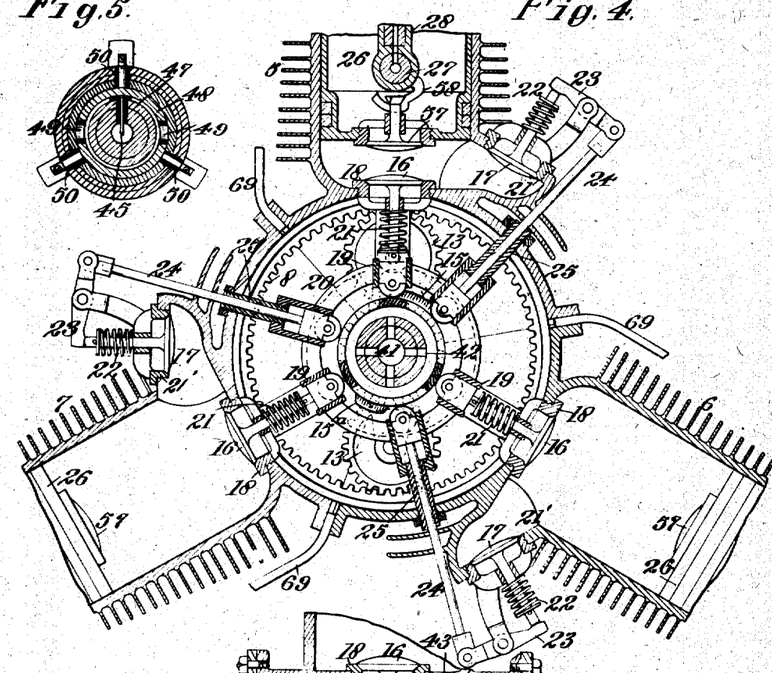
Fig. 4 is an enlarged central cross section of the engine, partly broken away.
Fig. 5 is a cross section on line 5—5 of Fig. 6.

Referring to Fig. 4, the cycle of cylinder 5 can be seen. The inlet valve 16 is positioned directly behind cam 15 and as the cylinder revolves at a greater speed than the sleeve supporting the cam 15 it can be seen that valve 16 will be opened and remain open while the cylinder is turned from the position shown at 5 to an opposite position in direct alinement therewith. An explosive mixture or charge is admitted from the carbureter, indicated at 40, through a passage 41 formed in the hollow crank shaft and crank pin. This charge escapes through radially positioned ports 42 and slots formed in the cam sleeve directly into the chamber formed within the hub member 4. It then passes by the inlet valve 16 directly into the cylinder 5 during the outward travel of the piston, which takes place while the cylinder moves from the position 5 to a point directly opposite. The speed of the cylinder with relation to the cam sleeve is such that the roller on the lower end of the inlet valve will just pass over the cam 15 when said position is reached. The valve will close at this point and thereby permit the charge admitted to be compressed while the cylinder travels from its lower position to the upper position.

The charge compressed is now ignited by a circuit established through a spark plug indicated at 43, thus forcing the piston in an outward direction during its travel from position 5 to a point directly opposite. The retarded movement of the cam sleeve or the greater speed of the cylinder is such that the roller operating the pusher rod of the exhaust valve will at this point overtake the cam 15ª and will override same while traveling from the lower position to the upper position. The expanded or burnt charge will, therefore, be exhausted as the piston travels inwardly. The four cycles of operation have been completed during two revolutions of the cylinder or during 1½ revolutions of the sleeve carrying the cams 15 and 15ª.

The inlet valve of the cylinder 5 at the commencement of the first cycle stands in the position shown in Fig. 4 with relation to cam 15 so that the movement of the cylinder from the upper to the lower position will open the inlet valve. The position of the cam 15ª after the four strokes in cylinder 5 have been completed will be the same as the position of cam 15. It will then open the inlet valve of cylinder 5 and permit the next cycle of operation to take place. Each cam 15 and 15ª alternately operates one cylinder and as their position is always fixed or timed with relation to each other, due to the gear ratio, it can readily be seen that each cylinder will complete a cycle of operation during two revolutions of the hub member.

Figure 14:
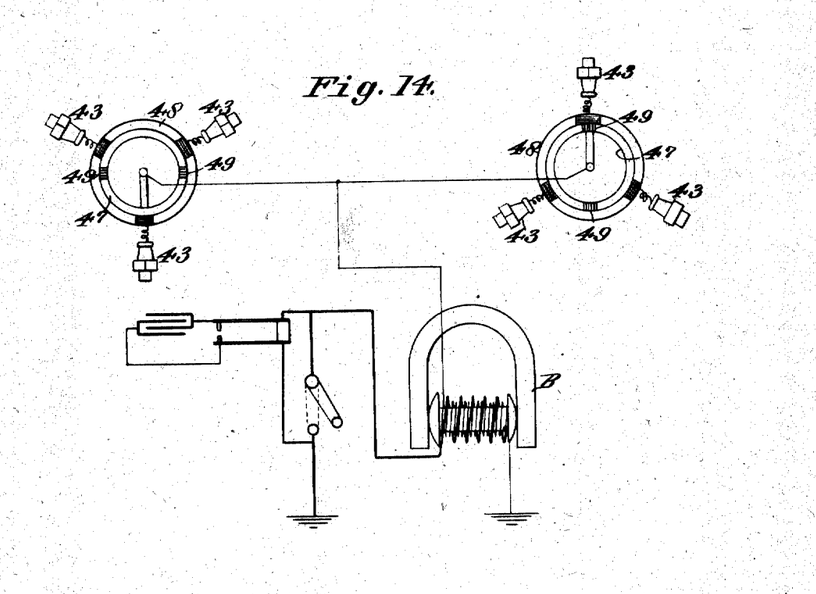
Fig. 14 is a diagrammatic view of the ignition system.

The current employed for the operation of the spark plugs 43 is supplied by a high tension magneto indicated at B supported on the web 2 of the stationary crank shaft. This magneto is driven from a gear 44 secured on the hub member which intermeshes with a gear on the magneto. The current passes through a wire 45 which is connected with a distributer 46 secured in a stationary ring 47, and a second ring 48 surrounding the ring 47 travels with the cam sleeve. This ring carries a pair of contacts 49 which are adapted to engage brushes 50 traveling with the hub member. The current is distributed through said brushes to the individual plugs at the proper time, thereby igniting the charges, the wiring diagram of the magneto circuit being shown in Fig. 14.

It will be noticed, by referring to the drawings, that the force of each explosion is exerted to drive the pistons in an outward direction and not to drive them inwardly as is usually the case. This is one of the important features of the present invention as the blow or shock exerted by each explosion is distributed to the periphery of the flywheel, the widely separated bearings 34 supporting same, and particularly against the hub bearing or crank pin 3. In other words, a large bearing area is provided to absorb the shock of each explosion. An advantage is furthermore taken of the fact that the power generated is exerted on the same line as the centrifugal action of the revolving parts, permitting loose or worn connecting rod bushings to operate without noise or vibration.

The engine constructed as here shown is particularly adapted for aviation purposes as the comparatively high revolving speed of the cylinders and fly-wheel provides ideal conditions for air cooling. Each exhaust valve discharging to the atmosphere is, therefore, positioned on the forward side of each cylinder where it is exposed to the circulating air, and each cylinder and valve is provided with cooling ribs to permit the heat radiated to be readily carried off.

The cylinders and pistons are further cooled by providing the following structure: Secured on the outer end of each cylinder is a head member 52, in the center portion of which is secured a semi-circular sliding plate 53 through which the piston rods 28 pass. Slidably mounted on each piston-rod is a socket collar 54 which is pivotally mounted in the sliding plate, and formed in each cylinder proper are two sets of auxiliary ports 55 and 56. Each piston on its inward movement draws in a charge of fresh air through the ports 55 and 56 which is partly expelled during the outward movement of the pistons. A portion of this air is trapped during the outward stroke of the piston, as the lower end of the piston will close said ports and compress the charge between the head 52 and the piston. This charge of compressed air is admitted to the firing chamber of the cylinder during the end of the suction stroke and also at the beginning of the exhaust stroke. The air under compression admitted during the suction strokes increases the volumetric capacity of the cylinder, while the charge admitted during the exhaust stroke assists in more thoroughly scavenging any burnt gases that might remain.

The air compressed between the head 52 and the piston is admitted to the firing chamber through a valve 57 carried in the head of the piston.

Figures 7, 8, 9, 10, 11:
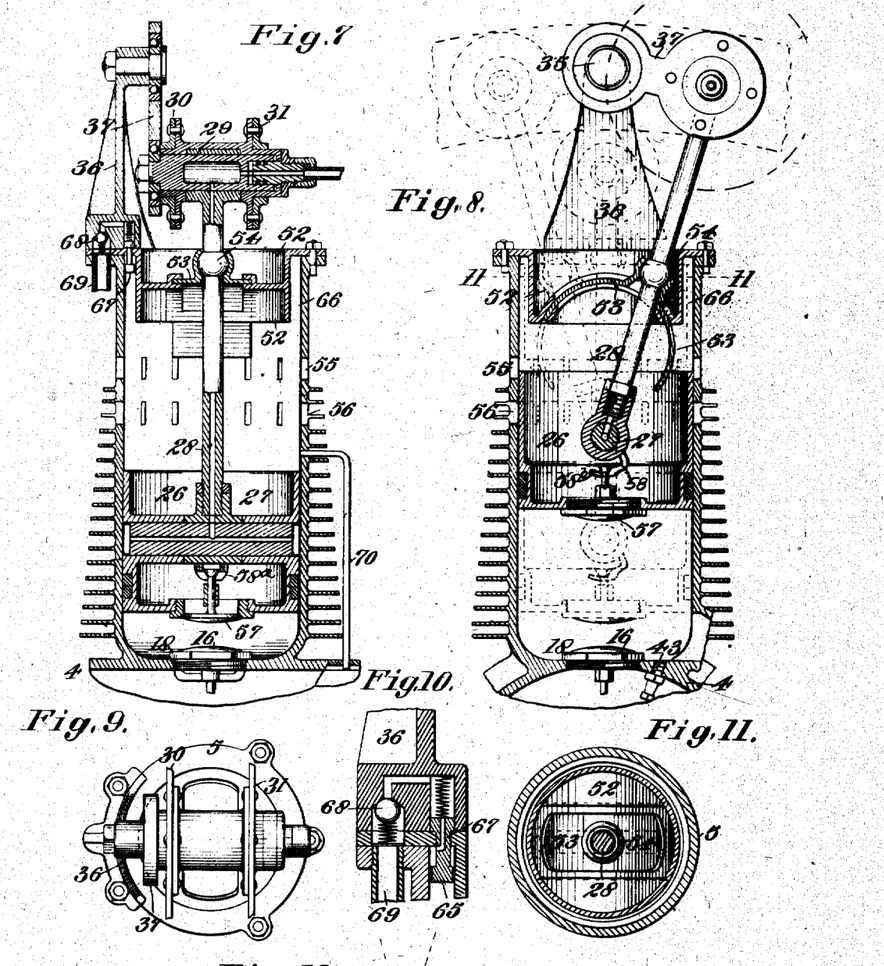
Fig. 7 is a cross section of one of the cylinders, showing the connection between the piston rod and the fly-wheel.
Fig. 8 is a similar view taken at right angles to Fig. 7.
Fig. 9 is a plan view of Fig. 8.
Fig. 10 is an enlarged detail view of the check valve and lubricating pump employed in connection with each cylinder.
Fig. 11 is a cross section on line 11—11 of Fig. 8.
Figure 12:
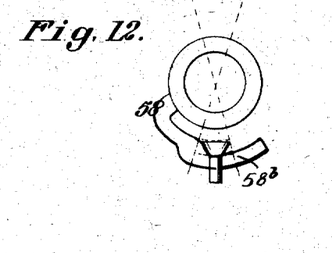
Fig. 12 is a detail view of the auxiliary air valve locking cam.
Figure 13:
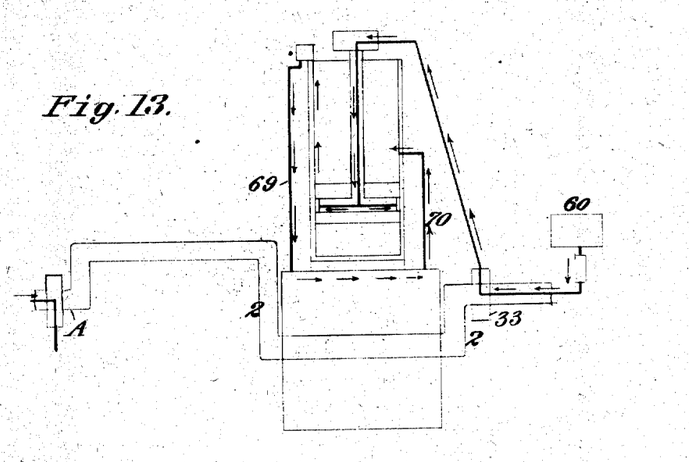
Fig. 13 is a diagrammatic view of the lubricating system.

The cam is in reality fork-shaped, as shown at 58ª in Fig. 7, to permit it to straddle the stem of the valve and it is also offset, as shown at 58ᵇ, to permit the valve to open under certain conditions. As the cam is carried by the connecting rod it can readily be seen that it will rock or oscillate in unison with same and also that this movement may be utilized to positively close the valve. Retaining of the valve in closed position while the piston is moving outwardly on the exhaust stroke is of great importance as a charge of fresh air is simultaneously being compressed between the piston and the outer head 52. This air, when reaching a certain pressure, would force the valve open the moment said pressure exceeded the cylinder pressure, this being particularly true when the piston has moved to a point where the auxiliary exhaust ports 56 have been uncovered, as the air pressure would then reach the maximum pressure while the exhaust gases would attain their minimum pressure.

Opening of the valve at this point would permit the air under pressure to escape through the ports 56 and would only be wasted, while opening of the valve on the return stroke of the piston, that is, after the ports 56 have been covered, will be a great benefit both for cooling and scavenging purposes as the air under pressure thus admitted would pass through the cylinder and drive the remaining gases through the exhaust valve proper, thus completely scavenging the cylinder and also serving as a means for assisting in cooling same.

The valve should not open before the piston has moved sufficiently far on the return stroke to cover the auxiliary exhaust ports. This is not only important during the exhaust stroke but also during the compression stroke. If the piston has moved outwardly and drawn in a fresh charge of explosive mixture, opening of the valve would only permit the compressed air to escape through the ports and would, therefore, not add to the volumetric charge of the cylinders, while opening of the valve, after the piston has closed the auxiliary exhaust ports, permits the charge to enter the cylinder and thereby materially increases the charge in volume. The opening of the valve at this point is of great importance both during the scavenging and during the compression stroke.

The means provided for controlling the opening of the valve is the cam 58. The offset is formed at a point where the oscillating movement of the connecting rod permits the valve to open just after the piston has passed the auxiliary exhaust ports. The valve automatically seats itself the moment the excess pressure in the outer end of the cylinder has escaped and equalized itself with the charge in the firing end of the cylinder. Compression of the charge in the firing end of the cylinder, together with the centrifugal force, will quickly close the valve and it will naturally remain closed at all times except when a high pressure is produced in the outer end of the cylinder;
the cam 58 being merely provided for the purpose of holding the valve against being opened when the piston reaches the extreme outer end of its stroke, because opening of the valve at this point would merely permit an escape of the compressed charge without any material beneficial result. The outward movement of each piston is such that the ports 56 will be uncovered both during the suction and the exhaust stroke, thereby per-
mitting said ports to serve as auxiliary exhaust ports. The ports 55 and 56 also permit the cool air to circulate through the outer end of each cylinder when it is uncovered by the piston, thus materially decreasing the temperature of same. A fresh charge of air is, of course, admitted during each reciprocation of each piston and the said charge is also compressed and passed through the pistons and valves once during each reciprocation. The cylinders are, therefore, not only cooled, both externally and internally, but advantage is also taken for utilizing the compressed charges to more thoroughly scavenge the cylinders and also to increase the volumetric charge during each suction stroke.

Figure 6:
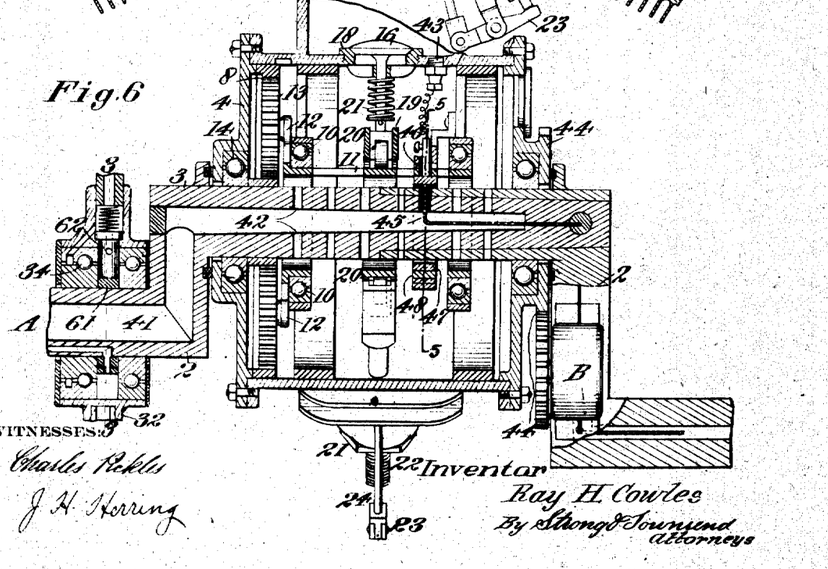
Fig. 6 is a longitudinal section through Fig. 4.

The engine as a whole is lubricated in the following manner: 60 indicates a tank or other suitable source of supply from which lubricating oil is delivered to a bearing member 34. Secured on the crank shaft, interiorly of the bearing member, is an eccentric 61 (see Figs. 3 and 6), and mounted in the revolving part of the bearing member is a plurality of spring-actuated ported pistons 62. Each piston is mounted in the hollow spoke 32 connecting with a crank pin 29 and oil is forced out through said hollow spokes into the pins 29 and then through passages formed in the connecting rods into passages formed in the wrist pins 27. The oil is here permitted to discharge on each side of the piston and will thoroughly lubricate the inner walls of the cylinders. No oil has a tendency to pass beyond the piston into the compression space as the centrifugal action has a tendency to force the lubricating oil outwardly against the head 52 which is set in, as shown in Figs. 7 and 8, to form an annular channel 66. Fouling of the spark plugs and the formation of carbon in the cylinders is thereby practically prevented as no oil can enter the compression spaces formed.

The oil draining outwardly through each cylinder is permitted to pass through a ported pumping piston 67 (see Figs. 7 and 10) similar to the pistons 61. These pistons are reciprocated by engagement with the main pistons and serve as force pumps to drive the oil past a check valve 68 and through a tube 69 back to the hub member. The hub member is provided with an annular channel for the reception of said oil and it serves to lubricate the gears and bearings and is also permitted to pass, by centrifugal action, through a pipe 70 back to the cylinders to be again returned by the force pumps produced by the pistons 67. The oil is thus permitted to circulate around and around and any oil lost by evaporation, burning or leakage is constantly being replaced from the source of supply indicated by the tank 60.

While the pistons 67 and 61 are here shown as provided for the purpose of maintaining a forced circulation, it is obvious that any other suitable form of force pump may be interposed between the source of supply and the engine, if desired.

Figures 15, 16, 17, 18:
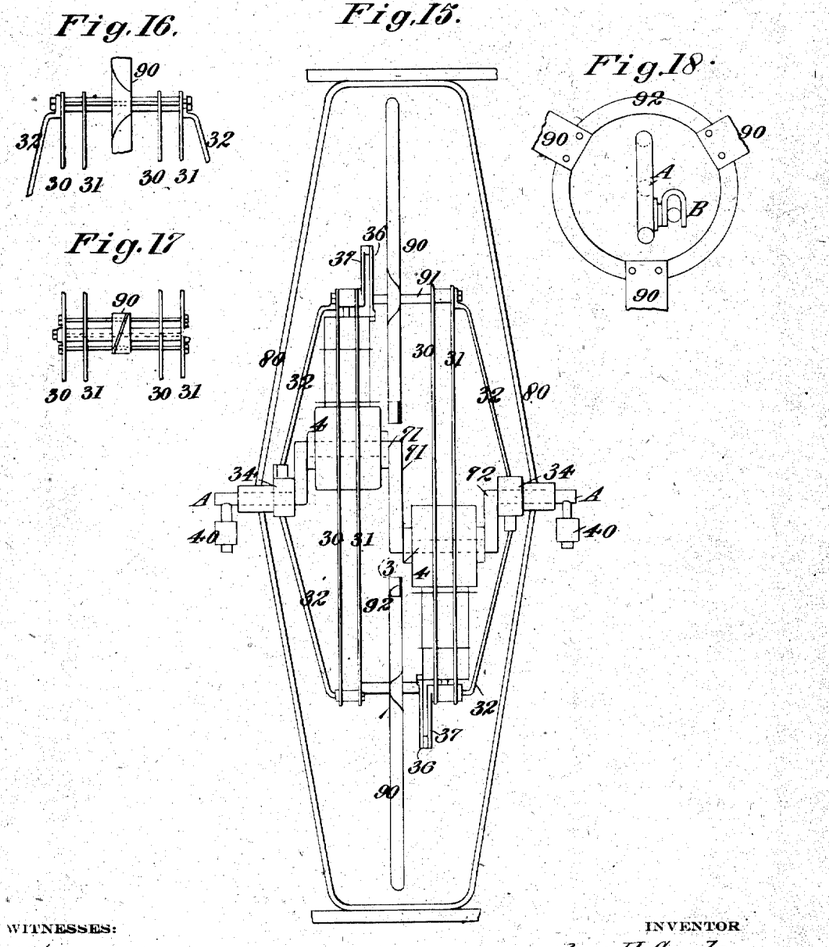
Fig. 15 is a diagrammatic plan view of the engine.
Fig. 16 is a side elevation, partly broken away, of a propeller blade showing the method of securing it between the fly-wheels.
Fig. 17 is a plan view of Fig. 16.
Fig. 18 shows how the inner ends of the propeller blades are secured and also the position of the magneto.

By referring to the diagrammatic plan view of the engine, shown in Fig. 15, it will be seen that the crank shaft is provided with two offsets indicated at 71 and 72 and that two sets of cylinders each comprising a unit of three is provided. This is of considerable importance as it permits a perfect balance and practically eliminates vibration of the revolving parts. The pistons, connecting rods and oscillating parts are counterbalanced by placing the separate units of three cylinders each on the separate crank pins which are positioned 180° apart. The pistons are balanced by the opposite positions assumed by same and the rods are balanced in a similar manner, thereby maintaining an exact counterbalance at all times during each revolution. The crank shaft is preferably secured in a frame, generally indicated at 80, thereby relieving the shaft of twisting strains, as it is supported at each end, and allowing a lighter construction than where the entire power output of the engine is transmitted through one end of the shaft only.

The provision of two units of cylinders spaced apart and positioned with relation to each other, as here shown, is another important feature, as it permits the propeller blades 90 to be secured between same. The blade stresses are partly equalized by being supported and driven from a point in proximity to the center of the stresses, as shown at 91, in effect allowing a reduction in weight, an increase in efficiency by reduction of blade vibration, and a high rate of speed with safety. Furthermore, the three blades shown may be maintained 120° apart and they are at all times rigidly braced by the spokes 32, the particular manner of fastening the blades at the point 90 being shown in Figs. 16 and 17 while the inner ends of the blades may be secured, as shown in Figs. 15 and 18, to a ring 92.

Having thus described my invention, what I claim and desire to secure by Letters Patent is—

1. In a rotary internal combustion engine, a stationary crank shaft, a fly wheel journaled on the shaft, a plurality of cylinders journaled to revolve about the crank pin on the shaft, a driving connection between the cylinders and the fly wheel permitting eccentric movement of one with relation to the other, a piston in each cylinder, a connecting rod connecting each piston with the fly wheel, means for admitting an explosive mixture through the inner end of each cylinder and means for igniting said mixture.

2. In a rotary engine, a stationary crank shaft, a fly-wheel journaled on the shaft, a plurality of cylinders journaled to revolve about the crank pin of the shaft within the fly-wheel, a crank connection between each cylinder and the fly-wheel, a piston in each cylinder, a connecting rod connecting each piston with the fly-wheel, an inlet and an exhaust valve in the inner end of each cylinder, and means for admitting an auxiliary charge of compressed air to each cylinder during each suction and scavenging stroke.

3. In a rotary engine, a stationary crank shaft, a fly-wheel journaled on the shaft, a plurality of cylinders journaled to revolve about the crank pin of the shaft within the fly-wheel, a crank connection between each cylinder and the fly-wheel, a piston in each cylinder, a connecting rod connecting each piston with the fly-wheel, an inlet and an exhaust valve in the inner end of each cylinder, a closure for the outer end of each cylinder, a sliding plate in each closure through which the piston rods pass, means for admitting air to each cylinder to be compressed between the closures and the pistons during the outward movement of the pistons, and means for transferring said air charges when compressed to the firing chambers of the cylinder.

4. In a rotary engine, a stationary crank shaft, a fly-wheel journaled on the shaft, a plurality of cylinders journaled to revolve about the crank pin of the shaft within the fly-wheel, a crank connection between each cylinder and the fly-wheel, a piston in each cylinder, a connecting rod connecting each piston with the fly-wheel, an inlet and an exhaust valve in the inner end of each cylinder, a closure for the outer end of each cylinder, a sliding plate in each closure through which the piston rods pass, ports formed in each cylinder to admit air between the closures and the pistons, said ports being arranged to be covered by the pistons during their outward stroke to permit compression of the air admitted, a valve in each piston, and means for opening and closing said valves to permit a compressed air charge to be admitted to the firing chamber of each cylinder both during the scavenging stroke and the suction stroke.

5. In a rotary engine, a stationary crank shaft, a fly-wheel journaled on the shaft, a plurality of cylinders journaled to revolve about the crank pin of the shaft within the fly-wheel, a crank connection between each cylinder and the fly-wheel, a piston in each cylinder, a connecting rod connecting each piston with the fly-wheel, an inlet and an exhaust valve in the inner end of each cylinder, a sleeve member journaled to revolve about the crank pin, a pair of cam members carried by said sleeve, and means for transmitting movement from the rotating cylinders to turn the sleeve so that each inlet and exhaust valve will be opened once during each two revolutions of the cylinders.

6. In a rotary engine, a stationary crank shaft, a fly-wheel journaled on the shaft, a plurality of cylinders journaled to revolve about the crank pin of the shaft within the fly-wheel, a crank connection between each cylinder and the fly-wheel, a piston in each cylinder, a connecting rod connecting each piston with the fly-wheel, an inlet and an exhaust valve in the inner end of each cylinder, a sleeve member journaled to revolve about the crank pin, a pair of cam members carried by said sleeve, a stationary gear secured on the crank pin, an internal gear adapted to revolve with the cylinders, and intermediate gears carried by the sleeve intermeshing both with the stationary gear and the internal gear adapted to transmit movement from the internal gear to revolve the sleeve 1½ revolutions while the internal gear makes two revolutions.

7. A rotary engine comprising a stationary crank shaft, a hollow hub member journaled to revolve about the crank pin of the shaft, a plurality of radially disposed cylinders secured to the hub members, a fly-wheel journaled on the crank shaft and eccentric with relation to the hub and cylinders, a piston in each cylinder, a connecting rod for each piston connected at its inner end to the piston and at its outer end to the fly-wheel, a crank connection between each cylinder and the fly-wheel, a puppet exhaust and inlet valve in the inner end of each cylinder, and means within the hub member for opening said valves once during two revolutions of the hub member and the cylinders carried thereby.

8. A rotary engine comprising a stationary crank shaft, a hollow hub member journaled to revolve about the crank pin of the shaft, a plurality of radially disposed cylinders secured to the hub members, a fly-wheel journaled on the crank shaft and eccentric with relation to the hub and cylinders, a piston in each cylinder, a connecting rod for each piston connected at its inner end to the piston and at its outer end to the fly-wheel, a crank connection between each cylinder and the fly-wheel, a puppet exhaust and inlet valve in the inner end of each cylinder, an internal gear secured to revolve with the hub member, a stationary gear secured on the crank pin, a sleeve turnably mounted about the crank pin, a pair of cam members on the sleeve adapted to operate the puppet valves, and intermediate gears carried by the sleeve intermeshing both with the internal and the stationary gear adapted to transmit movement from the internal gear to revolve the sleeve one revolution while the hub member, the cylinders, and the internal gear revolve one and one-third revolutions.

9. A rotary engine comprising a stationary crank shaft, a hollow hub member journaled to revolve about the crank pin of the shaft, a plurality of radially disposed cylinders secured to the hub members, a fly-wheel journaled on the crank shaft and eccentric with relation to the hub and cylinders, a piston in each cylinder, a connecting rod for each piston connected at its inner end to the piston and at its outer end to the fly-wheel, a crank connection between each cylinder and the fly-wheel, a puppet exhaust and inlet valve in the inner end of each cylinder, means within the hub member for opening said valves once during two revolutions of the hub member and the cylinders carried thereby, means for admitting a combustible mixture to the hollow hub member and transferring said mixture through the inlet valves to the respective cylinders, and means for igniting the mixture when compressed in the cylinders.

10. A rotary engine comprising a stationary crank shaft, a hollow hub member journaled to revolve about the crank pin of the shaft, a plurality of radially disposed cylinders secured to the hub members, a fly-wheel journaled on the crank shaft and eccentric with relation to the hub and cylinders, a piston in each cylinder, a connecting rod for each piston connected at its inner end to the piston and at its outer end to the fly-wheel, a crank connection between each cylinder and the fly-wheel, a puppet exhaust and inlet valve in the inner end of each cylinder, an internal gear secured to revolve with the hub member, a stationary gear secured on the crank pin, a sleeve turnably mounted about the crank pin, a pair of cam members on the sleeve adapted to operate the puppet valves, intermediate gears carried by the sleeve intermeshing both with the internal and the stationary gear adapted to transmit movement from the internal gear to revolve the sleeve one revolution while the hub member, the cylinders, and the internal gear revolve one and one-third revolutions, means for admitting a combustible mixture to the hollow hub member and transferring said mixture through the inlet valves to the respective cylinders, a spark plug in each cylinder, and a distributer carried by the sleeve adapted to close an electric circuit through each plug once during each two revolutions of the cylinders.

11. A rotary engine comprising a stationary crank shaft, a hub member journaled to rotate about the crank pin, a plurality of cylinders carried by the hub member, a fly-wheel comprising two rim sections surrounding and eccentrically positioned with relation to the cylinders, bearings turnably mounted on the crank shaft, spokes connecting the fly-wheel rim sections with the bearings, pins connecting the rim sections, crank connections between each pin and cylinder, a piston in each cylinder, and a connecting rod carried by each pin connected with a piston.

12. A rotary engine comprising a stationary crank shaft having a pair of cranks disposed at angles 180° apart, a hub member journaled to rotate about each crank, a plurality of cylinders carried by each hub member, the cylinders on one hub member being positioned intermediately the cylinders on the other hub member, a hub member journaled to rotate on each end of the crank shaft, spokes radiating from each hub, a fly-wheel for each set of cylinders carried by each set of spokes, bolts connecting the fly-wheels, a propeller secured to the fly-wheels between the cylinders, a piston and connecting rod in each cylinder connected to the respective fly-wheels, and a crank connection between the outer end of each cylinder and the adjacent fly-wheel.

13. A rotary engine comprising a stationary crank shaft, a hub member journaled to rotate about the crank pin, a plurality of cylinders carried by the hub member, a fly-wheel comprising two rim sections surrounding and eccentrically positioned with relation to the cylinders, bearings turnably mounted on the crank shaft, spokes connecting the fly-wheel rim sections with the bearings, pins connecting the rim sections, crank connections between each pin and cylinder, a piston in each cylinder, a connecting rod carried by each pin connected with a piston, conduits formed in the spokes, the fly-wheel rim, pins, the connecting rods and cross head pins carried by the pistons, and means for circulating a lubricant through said conduits.

14. A rotary engine comprising a stationary crank shaft, a hub member journaled to rotate about the crank pin, a plurality of cylinders carried by the hub member, a fly-wheel comprising two rim sections surrounding and eccentrically positioned with relation to the cylinders, bearings turnably mounted on the crank shaft, spokes connecting the fly-wheel rim sections with the bearings, pins connecting the rim sections, crank connections between each pin and cylinder, a piston in each cylinder, a connecting rod carried by each pin connected with a piston, conduits formed in the spokes, the fly-wheel rim, pins, the connecting rods and cross head pins carried by the pistons, means for circulating a lubricant through said conduits, means for collecting the lubricant which tends to escape from the ends of the cylinders, a force pump adapted to deliver said oil to the hollow hub member, and means for returning the oil to lubricate the pistons in the cylinders.

15. In a rotary engine, a shaft, a hollow hub member journaled to rotate about the shaft, said hub member having an oil collecting chamber formed therein, a plurality of cylinders carried by the hub member and having their outer ends open, pistons in the cylinders, means for supplying a lubricant to the cylinders, a collecting chamber on the outer end of each cylinder to receive surplus oil from the cylinders by centrifugal action, a force pump connected with each chamber adapted to return said oil to the collecting chamber in the hub member, and conduits leading from said chamber adapted to return the oil by centrifugal action to the cylinders.

16. In a rotary engine, a shaft, a hollow hub member journaled to rotate about the shaft, said hub member having an oil collecting chamber formed therein, a plurality of cylinders carried by the hub member and having their outer ends open, pistons in the cylinders, means for supplying a lubricant to the cylinders, a collecting chamber on the outer end of each cylinder to receive surplus oil from the cylinders by centrifugal action, a force pump connected with each chamber actuated by the pistons adapted to return said oil to the collecting chamber in the hub member, and conduits leading from said chamber adapted to return the oil by centrifugal action to the cylinders.

17. In a rotary engine, a shaft, a hollow hub member journaled to rotate about the shaft, a plurality of cylinders secured to the hub member, a piston in each cylinder, a connecting rod on each piston extending through the outer end of each cylinder, a fly-wheel to which said rods are connected, a spark plug in each cylinder, a sleeve journaled to rotate about the shaft, a distributer carried by said sleeve adapted to close an electric circuit through each plug in successive order, and means connected with the shaft and the revolving hub member for transmitting movement to the sleeve and distributer to revolve the same one revolution and a half while the hub member revolves two revolutions.

18. In a rotary four-cycle engine, a cylinder, a head on each end of the cylinder, a piston dividing the cylinder into a firing chamber and an air compressing chamber, a sliding plate in one of said heads, a piston rod connected with the piston passing through the plate, a valve in the piston, means for admitting air to one end of the cylinder to be compressed, and means for mechanically opening and closing the valve in the piston to admit a compressed charge of air to the firing chamber.

19. In a rotary engine, a stationary crank shaft, a fly-wheel journaled on the shaft, a plurality of cylinders journaled to revolve about the crank pin of the shaft within the fly-wheel, a crank connection between each cylinder and the fly-wheel, a piston in each cylinder, a connecting rod connecting each piston with the fly-wheel, an inlet and an exhaust valve in the inner end of each cylinder, said cylinders also having auxiliary exhaust ports formed therein adapted to be covered and uncovered by the pistons, and means for admitting an auxiliary charge of compressed air to each cylinder during each suction and scavenging stroke.

20. In a rotary engine, a stationary crank shaft, a fly-wheel journaled on the shaft, a plurality of cylinders journaled to revolve about the crank pin of the shaft within the fly-wheel, a crank connection between each cylinder and the fly-wheel, a piston in each cylinder, a connecting rod connecting each piston with the fly-wheel, an inlet and an exhaust valve in the inner end of each cylinder, and means for admitting an auxiliary charge of compressed air to each cylinder during the beginning of each exhaust and compression stroke.

21. In a rotary engine, a stationary crank shaft, a fly-wheel journaled on the shaft, a plurality of cylinders journaled to revolve about the crank pin of the shaft within the fly-wheel, a crank connection between each cylinder and the fly-wheel, a piston in each cylinder, a connecting rod connecting each piston with the fly-wheel, an inlet and an exhaust valve in the inner end of each cylinder, said cylinders also having auxiliary exhaust ports formed therein adapted to be covered and uncovered by the pistons, and means for admitting an auxiliary charge of compressed air to each cylinder during the beginning of each exhaust and compression stroke after the auxiliary exhaust ports have been closed by the movement of the pistons.

22. In a rotary engine, a stationary crank shaft, a fly-wheel journaled on the shaft, a plurality of cylinders journaled to revolve about the crank pin of the shaft within the fly-wheel, a crank connection between each cylinder and the fly-wheel, a piston in each cylinder, a connecting rod connecting each piston with the fly-wheel, an inlet and an exhaust valve in the inner end of each cylinder, said cylinders also having auxiliary exhaust ports formed therein adapted to be covered and uncovered by the pistons, means for admitting an auxiliary charge of compressed air to each cylinder during the beginning of each exhaust and compression stroke after the auxiliary exhaust ports have been closed by the movement of the pistons, a valve in each piston for admitting said auxiliary charge, and means for positively timing the opening of said valve.

23. In a rotary engine, a stationary crank shaft, a fly-wheel journaled on the shaft, a plurality of cylinders journaled to revolve about the crank pin of the shaft within the fly-wheel, a crank connection between each cylinder and the fly-wheel, a piston in each cylinder, a connecting rod connecting each piston with the fly-wheel, an inlet and an exhaust valve in the inner end of each cylinder, said cylinders also having auxiliary exhaust ports formed therein adapted to be covered and uncovered by the pistons, means for admitting an auxiliary charge of compressed air to each cylinder during the beginning of each exhaust and compression stroke after the auxiliary exhaust ports have been closed by the movement of the pistons, a valve in each piston for admitting said auxiliary charge, and means for positively timing the opening of said valve, said means comprising a fork-shaped cam adapted to straddle the stem of the valve, said cam having an offset portion which permits opening of the valve when a predetermined angular position is assumed by the piston connecting rod.

24. In a rotary engine, a stationary crank shaft, a fly-wheel journaled on the shaft, a plurality of cylinders journaled to revolve about the crank pin of the shaft within the fly-wheel, a crank connection between each cylinder and the fly-wheel, a piston in each cylinder, a connecting rod connecting each piston with the fly-wheel, a puppet inlet and a puppet exhaust valve positioned at the inner end of each cylinder, and means for positively opening said valves during a revolution of the cylinders to permit a four-cycle operation.

25. In a rotary four-cycle engine, a cylinder, a head on each end of the cylinder, a piston dividing the cylinder into a firing chamber and an air compressing chamber, a sliding plate in one of said heads, a piston rod connected with the piston passing through the plate, a ball mounted in the plate forming a packing for the piston rod, a valve in the piston, means for admitting air to one end of the cylinder to be compressed, and means for mechanically opening and closing the valve in the piston to admit a compressed charge of air to the firing chamber.

26. In a rotary internal combustion engine, a stationary crank shaft, a fly wheel journaled on the shaft, a plurality of cylinders journaled to revolve about the crank pin of the shaft, a crank connection between each cylinder and the fly wheel, an inner and an outer head on each cylinder, said outer heads extending into each cylinder and spaced therefrom to form an annular chamber, a piston in each cylinder dividing each cylinder into a firing chamber and an air compressing chamber, the outer end of each piston adapted to enter the annular chambers formed between the cylinders and the outer heads, a connecting rod connecting each piston with the fly wheel, and a sliding plate in each outer head through which each piston rod extends.

27. In a rotary internal combustion engine, a stationary crank shaft, a fly wheel journaled on the shaft, a plurality of cylinders journaled to revolve about the crank pin of the shaft, a crank connection between each cylinder and the fly wheel, an inner and an outer head on each cylinder, said outer heads extending into each cylinder and spaced therefrom to form an annular chamber, a piston in each cylinder dividing each cylinder into a firing chamber and an air compressing chamber, the outer end of each piston adapted to enter the annular chambers formed between the cylinders and the outer heads, a connecting rod connecting each piston with the fly wheel, a sliding plate in each outer head through which each piston rod extends and a packing member in each sliding head surrounding each piston rod.

28. In an engine of the character described, a cylinder, an inner and an outer head on the cylinder, said outer head extending into the cylinder and spaced therefrom to form an annular chamber, a piston dividing the cylinder into a firing chamber and an air compressing chamber, a sliding plate in the outer head, and a piston rod connected with the piston passing through the plate.

29. In an engine of the character described, a cylinder, an inner and an outer head on the cylinder, said outer head extending into the cylinder and spaced therefrom to form an annular chamber, a piston dividing the cylinder into a firing chamber and an air compressing chamber, a circular sliding plate mounted in the outer head, a piston rod connected with the piston passing through said plate, and a ball mounted in the sliding plate forming a packing for the piston rod, the outer end of said piston adapted to enter the annular chamber formed by the outer head when assuming its outermost position.

30. In a rotary internal combustion engine, a stationary crank shaft, a fly wheel journaled on the shaft, a plurality of cylinders journaled to revolve about the crank pin of the shaft, a crank connection between each cylinder and the fly wheel, an inner and an outer head on each cylinder, a piston in each cylinder, a connecting rod for each piston passing through the outer heads and connected with the fly wheel, an exhaust and an inlet puppet valve mounted at the inner end of each cylinder, means for mechanically opening said valves once during each two revolutions of the cylinders and fly wheel, means for admitting air during each stroke of each piston to a compressing chamber formed between each outer head and each piston and means for transferring said air when compressed to the firing chamber of each cylinder.

In testimony whereof I have hereunto set my hand in the presence of two subscribing witnesses.

RAY H. COWLES.

Witnesses:
JOHN H. HERRING,
W. W. HEALEY.